US010951507B1

(12) United States Patent
Slavin

(10) Patent No.: US 10,951,507 B1
(45) Date of Patent: *Mar. 16, 2021

(54) NETWORK DEVICE MANAGEMENT TECHNOLOGY

(71) Applicant: Alarm.com Incorporated, Tysons, VA (US)

(72) Inventor: Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,343

(22) Filed: Jan. 17, 2020

Related U.S. Application Data

(63) Continuation of application No. 15/934,271, filed on Mar. 23, 2018, now Pat. No. 10,541,902, which is a (Continued)

(51) Int. Cl.
| | |
|---|---|
| *H04L 12/26* | (2006.01) |
| *G08B 25/08* | (2006.01) |
| *H04L 12/24* | (2006.01) |
| *H04L 29/08* | (2006.01) |
| *G06F 8/65* | (2018.01) |
| *G06F 3/0484* | (2013.01) |
| *H04W 4/80* | (2018.01) |
| *H04L 12/28* | (2006.01) |
| *G08B 25/14* | (2006.01) |
| *H04W 12/08* | (2021.01) |

(52) U.S. Cl.
CPC ............ *H04L 43/12* (2013.01); *G06F 3/0484* (2013.01); *G06F 8/65* (2013.01); *G08B 25/08* (2013.01); *G08B 25/14* (2013.01); *H04L 12/2816* (2013.01); *H04L 12/2823* (2013.01); *H04L 41/0677* (2013.01); *H04L 43/065* (2013.01); *H04L 67/10* (2013.01); *H04W 4/80* (2018.02); *H04L 12/282* (2013.01); *H04L 12/2803* (2013.01); *H04L 12/2818* (2013.01); *H04W 12/08* (2013.01)

(58) Field of Classification Search
CPC ... H04L 43/12; H04L 43/065; H04L 41/0677; H04L 12/2816; H04L 67/10; H04L 12/2823; H04L 12/2818; H04L 12/282; H04L 12/2803; G06F 8/65; G06F 3/0484; H04W 4/80; H04W 12/08; G08B 25/14; G08B 25/08
See application file for complete search history.

(56) References Cited

U.S. PATENT DOCUMENTS

| | | |
|---|---|---|
| 7,043,664 B1 | 5/2006 | Chiloyan |
| 7,127,733 B1 | 10/2006 | Ochoa |
| (Continued) | | |

*Primary Examiner* — Michael Won
(74) *Attorney, Agent, or Firm* — Fish & Richardson P.C.

(57) ABSTRACT

Techniques are described for providing network device management. In some implementations, a native mobile device application enables use of a mobile device to add new devices to a network, remove devices from a network, change network and device profile settings, troubleshoot a network, provide an interface into network devices, communications, diagnostics, etc., and provide remote access to the network for installation, programming, troubleshooting, and inclusion.

19 Claims, 8 Drawing Sheets

Related U.S. Application Data continuation of application No. 14/703,799, filed on May 4, 2015, now Pat. No. 9,929,929, which is a continuation of application No. 13/539,767, filed on Jul. 2, 2012, now Pat. No. 9,026,648, which is a continuation of application No. 12/782,674, filed on May 18, 2010, now Pat. No. 8,214,494.

(60) Provisional application No. 61/179,230, filed on May 18, 2009.

(56) References Cited

U.S. PATENT DOCUMENTS

| | | | |
|---|---|---|---|
| 7,143,153 | B1 | 11/2006 | Black |
| 7,290,037 | B2 | 10/2007 | Clark et al. |
| 7,296,079 | B2 | 11/2007 | Motoyama et al. |
| 7,349,360 | B2 | 3/2008 | Gutierrez et al. |
| 7,373,403 | B2 | 5/2008 | Kroboth |
| 7,398,331 | B2 | 7/2008 | Aoyama |
| 7,526,539 | B1 | 4/2009 | Hsu |
| 7,543,054 | B1 | 6/2009 | Bansod et al. |
| 7,865,252 | B2 | 1/2011 | Clayton |
| 8,019,849 | B1 | 9/2011 | Lopilato |
| 8,031,726 | B2 | 10/2011 | Ansari et al. |
| 8,073,931 | B2 | 12/2011 | Dawes et al. |
| 8,086,703 | B2 | 12/2011 | Baum et al. |
| 8,159,960 | B2 | 4/2012 | Cooppan |
| 8,185,619 | B1 | 5/2012 | Maiocco |
| 8,214,494 | B1 | 7/2012 | Slavin |
| 8,234,363 | B1 | 7/2012 | Kuo |
| 8,327,433 | B2 | 12/2012 | Yang et al. |
| 8,365,018 | B2 | 1/2013 | McIntosh |
| 8,769,412 | B2 | 7/2014 | Gill |
| 8,819,216 | B2 | 8/2014 | Kelder |
| 8,964,582 | B2 | 2/2015 | Wilkinson |
| 9,021,021 | B2 | 4/2015 | Backholm |
| 9,871,692 | B1 * | 1/2018 | Hutz ............... G08B 27/003 |
| 10,423,309 | B2 | 9/2019 | Kitchen |
| 10,567,479 | B2 * | 2/2020 | Tal ................... H04L 67/10 |
| 2003/0145039 | A1 | 7/2003 | Bonney |
| 2005/0125489 | A1 | 6/2005 | Hanes |
| 2005/0213511 | A1 | 9/2005 | Reece et al. |
| 2005/0222933 | A1 | 10/2005 | Wesby |
| 2006/0265489 | A1 | 11/2006 | Moore |
| 2007/0019654 | A1 | 1/2007 | Ha et al. |
| 2007/0180522 | A1 | 8/2007 | Bagnall |
| 2007/0223500 | A1 | 9/2007 | Lee et al. |
| 2008/0303661 | A1 | 12/2008 | Chick |
| 2009/0043883 | A1 | 2/2009 | Aydt |
| 2009/0070692 | A1 | 3/2009 | Dawes et al. |
| 2009/0100165 | A1 | 4/2009 | Wesley, Sr. |
| 2009/0132698 | A1 | 5/2009 | Barnhill, Jr. |
| 2010/0198963 | A1 | 8/2010 | Conneely et al. |
| 2011/0046800 | A1 | 2/2011 | Imes et al. |
| 2011/0112690 | A1 | 5/2011 | Caron et al. |
| 2011/0234399 | A1 | 9/2011 | Yan |
| 2011/0252124 | A1 | 10/2011 | Bonner |
| 2012/0017253 | A1 | 1/2012 | Hicks, III |
| 2012/0036250 | A1 | 2/2012 | Vaswani |
| 2012/0047011 | A1 | 2/2012 | Rippetoe et al. |
| 2012/0166618 | A1 | 6/2012 | Dahod |
| 2013/0007430 | A1 | 1/2013 | Fan |
| 2013/0103841 | A1 | 4/2013 | Werth |
| 2013/0110260 | A1 * | 5/2013 | Carpinteri ............ B60L 53/68 700/20 |
| 2013/0191524 | A1 | 7/2013 | Dupre |
| 2013/0205022 | A1 | 8/2013 | Kagan |
| 2014/0026188 | A1 | 1/2014 | Gubler |
| 2014/0118120 | A1 | 5/2014 | Chen et al. |
| 2014/0137188 | A1 | 5/2014 | Bartholomay |
| 2014/0280920 | A1 | 9/2014 | Foley |
| 2015/0044975 | A1 | 2/2015 | Lamb |
| 2015/0074259 | A1 | 3/2015 | Ansari |
| 2015/0112883 | A1 | 4/2015 | Orduna |
| 2016/0098234 | A1 | 4/2016 | Weaver |
| 2016/0164831 | A1 | 6/2016 | Kim |
| 2016/0191668 | A1 | 6/2016 | Werth |
| 2016/0285717 | A1 | 9/2016 | Kim |
| 2017/0206772 | A1 * | 7/2017 | Klimanis ............ H04B 11/00 |
| 2018/0302334 | A1 | 10/2018 | Osterlund |
| 2019/0287201 | A1 | 9/2019 | Orduna |

* cited by examiner

NETWORK DEVICE MANAGEMENT TECHNOLOGY

CROSS-REFERENCE TO RELATED APPLICATIONS

This application is a continuation of U.S. application Ser. No. 15/934,271, filed Mar. 23, 2018, which is a continuation of U.S. application Ser. No. 14/703,799, filed May 4, 2015, now U.S. Pat. No. 9,929,929, issued Mar. 27, 2018, which is a continuation of U.S. application Ser. No. 13/539,767, filed Jul. 2, 2012, now U.S. Pat. No. 9,026,648, issued May 5, 2015, which is a continuation of U.S. application Ser. No. 12/782,674, filed May 18, 2010, now U.S. Pat. No. 8,214,494, issued Jul. 3, 2012, which claims the benefit of U.S. Provisional Application No. 61/179,230, filed May 18, 2009. These prior applications are incorporated herein by reference in their entirety for all purposes.

TECHNICAL FIELD

This disclosure relates to network device management technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for network device management.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for providing network device management. In some implementations, a native mobile device application enables use of a mobile device to add new devices to a network, remove devices from a network, change network and device profile settings, troubleshoot a network, provide a GUI interface into network devices, communications, diagnostics, etc., and provide remote access to the network for installation, programming, troubleshooting, and inclusion.

Figure 1:
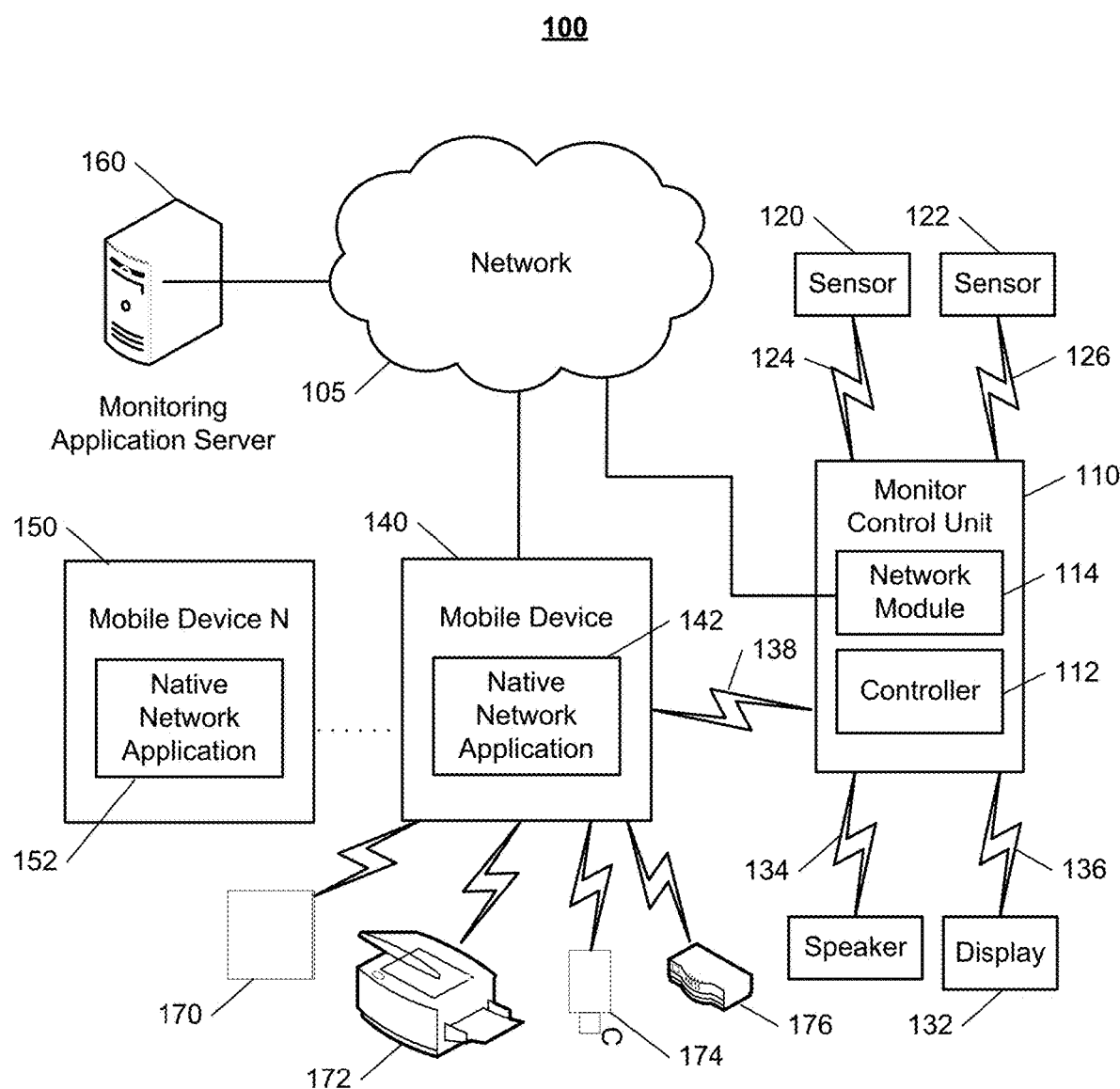
FIG. 1 is a block diagram of an example system.

FIG. 1 illustrates an example of an electronic system 100 configured to provide network device management using one or more mobile devices. The electronic system 100 includes a network 105, a monitoring system control unit 110, one or more mobile devices 140, 150, and a monitoring application server 160. In some examples, the network 105 facilitates communications between the monitoring system control unit 110, the one or more mobile devices 140, 150, and the monitoring application server 160.

The network 105 is configured to enable exchange of electronic communications between devices connected to the network 105. For example, the network 105 may be configured to enable exchange of electronic communications between the monitoring system control unit 110, the one or more mobile devices 140, 150, and the monitoring application server 160. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, an alarm system may include multiple sensors 120 and 122. The sensors 120 and 122 may include a contact sensor, a motion sensor, a glass break sensor, or any other type of sensor included in an alarm system or security system. The sensors 120 and 122 also may include an environmental sensor, such as a temperature sensor, a water sensor, a rain sensor, a wind sensor, a light sensor, a smoke detector, a carbon monoxide detector, an air quality sensor, etc. The sensors 120 and 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 and 122 may include a radio-frequency identification (RFID) sensor that identifies a particular article that includes a pre-assigned RFID tag. In addition, the sensors 120 and 122 may include a video/photographic camera or other type of optical sensing device configured to capture images and may include an energy consumption sensor for appliances and devices in a property monitored by the monitoring system.

The sensors 120 and 122 communicate with the controller 112 over communication links 124 and 126. The communication links 124 and 126 may be a wired or wireless data pathway configured to transmit signals from the sensors 120 and 122 to the controller 112. The sensors 120 and 122 may continuously transmit sensed values to the controller 112, periodically transmit sensed values to the controller 112, or transmit sensed values to the controller 112 in response to a change in a sensed value.

The controller 112 may receive signals from the sensors 120 and 122 and detect an alarm event based on the sensed values. For example, the sensor 120 may be a contact sensor provided on a door to a residence and the communication link 124 may be a wireless connection between the sensor 120 and the controller 112. In this example, the sensor 120 may sense that the door has been opened (e.g., absence of a connection between contacts included as part of the sensor) and wirelessly transmit data over communication link 124 to the controller 112 indicating that the door has been opened. The controller 112 receives the data from the sensor 120 over the communication link 124 and determines that an alarm event (e.g., the door opened) has occurred based on the signal from the sensor 120. The controller 112 controls operation of the alarm system based on the determination that the alarm event has occurred.

The monitoring system also includes a speaker 130. The speaker 130 may include an electromechanical transducer that converts an electrical signal into sound. The speaker 130 may receive an electrical signal from the controller 112 and produce an audible output based on the electrical signal. For example, the controller 112, in response to detecting an alarm event, may send a signal to the speaker 130 to cause the speaker to produce an audible alarm sound. The speaker 130 also may output audio messages (e.g., audio advertisements, broadcast audio alerts, etc.). In another example, the controller 112 may send a signal representative of a voice communication to the speaker 130 to cause the speaker to produce an audible output of the voice communication.

The monitoring system also includes a display 132. The display 132 may be any type of electronic display configured to render a visually perceivable display of information (e.g., an LCD display, a plasma display, a television, a computer monitor, a digital picture frame, a display integrated into an appliance, a display included in a portable device of a user, a mirror, a projection display device, etc.). The display 132 may be integrated in the monitoring system control unit 110 (e.g., control panel) or may be separate from the monitoring system control unit 110 (e.g., a separate display provided as part of the security system or a television, a computer monitor, etc. that is not part of the security system, but a device with which the security system may communicate). The display 132 may be used to depict the current state of the monitoring system. For example, an LCD display may display words like "System Disarmed 6:42 pm", or "Enter User Code to Disarm", or "Front Door Opened". The display 132 also may be used to display electronic content, such as advertisement content, news content, weather content, and entertainment content.

The monitoring system control unit 110 communicates with the speaker 130 and the display 132 over communication links 134 and 136. The communication links 134 and 136 may be similar to the communication links 124 and 126 described above.

The monitoring application server 160 is an electronic device configured to provide monitoring services by exchanging electronic communications with the monitoring system control unit 110 and the one or more mobile devices 140, 150 over the network 105. For example, the monitoring application server 160 may be configured to monitor events generated by the monitoring system control unit 110. In this example, the monitoring application server 160 may exchange electronic communications with the network module 114 included in the monitoring system control unit 110 to receive information regarding alarm events detected by the monitoring system control unit 110. Additionally or alternatively, the monitoring application server 160 may receive information regarding events from the one or more mobile devices 140, 150.

The monitoring application server 160 may store sensor data received from the monitoring system and perform analysis of sensor data received from the monitoring system. Based on the analysis, the monitoring application server 160 may communicate with and control aspects of the monitoring system control unit 110 or the one or more mobile devices 140, 150. The monitoring application server 160 may store network configuration protocols, user guides, and other information that may assist in configuration of network devices.

The one or more mobile devices 140, 150 are devices that host and display user interfaces and that host one or more native applications (e.g., the native network application 142, 152). The one or more mobile devices 140, 150 may be cellular phones or non-cellular locally networked devices with displays. The one or more mobile devices 140, 150 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The one or more mobile devices 140, 150 may be the same or may include mobile devices of different types. The one or more mobile devices 140, 150 may perform functions unrelated to the monitoring system, such as placing personal telephone calls, playing music, playing video, displaying pictures, browsing the Internet, maintaining an electronic calendar, etc.

The one or more mobile devices 140, 150 communicate with and receive monitoring system data from the monitoring system control unit 110 using the communication link 138. For instance, the one or more mobile devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more mobile devices 140, 150 to local security and automation equipment. The one or more mobile devices 140, 150 also may connect locally to other network devices, such as the appliance 170, the printer 172, the camera 174, and the router 176. The local connection may improve the speed of status and control communications because communicating through the network 105 with a remote server (e.g., the monitoring application server 160) may be significantly slower.

Although the one or more mobile devices 140, 150 are shown as being connected to the network 105, in some implementations, the one or more mobile devices 140, 150 are not connected to the network 105. In these implementations, the one or more mobile devices 140, 150 communicate directly with one or more of the monitoring system components and no network (e.g., Internet) connection or reliance on remote servers is needed.

The one or more mobile devices 140, 150 each include a native network application 142, 152, respectively. The native network application 142, 152 refers to a software/firmware program running on the corresponding mobile device that enables the user interface and features described below. The one or more mobile devices 140, 150 may load or install the native network application 142, 152 based on data received over a network or data received from local media. The native network application 142, 152 runs on mobile devices platforms, such as iPhone, iPod touch, Blackberry, Google Android, Windows Mobile, etc.

The native network application 142, 152 provides an interface for configuring and managing devices included in one or more home networks. The native network application 142, 152 functions as a universal programmer for multiple, different devices and multiple, different technologies and standards. Many types of home network devices exist and, in many cases, interfaces used to control the network devices do not exist, are limited, or are not currently available to a user that desires to configure a device on a home network. The native network application 142, 152 may provide users with an easy to use, standardized interface with which to configure and manage many different types of network devices, regardless of whether the network devices use different protocols or technologies.

For instance, as shown in FIG. 1, a user's home network may include a refrigerator 170 that communicates with zwave technology, a printer 172 that communicates using Bluetooth technology, a camera 174 that communicates using a wireless Internet-based protocol (e.g., 802.11b), and a router 176 that may be configured by accessing web pages made available by the router at a particular IP address. The native network application 142, 152 may provide an interface that enables a user to configure all of these different types of devices. The interface may be standardized between devices such that the user gets the same look and feel, regardless of which device the user is configuring. This may assist the user in more easily configuring all devices in the user's home.

The native network application 142, 152 may be used to add new devices to a network, remove devices from a network, change network and device profile settings, and troubleshoot a network. The native network application 142, 152 also may provide a GUI interface into network devices, communications, diagnostics, etc. and provide remote access to a home network for installation, programming, troubleshooting, and inclusion.

For instance, the native network application 142, 152 may be used as an inclusion device to add and remove zwave nodes on a zwave network (e.g., add the refrigerator 170). The native network application 142, 152 may function as a zwave controller by using the zwave proprietary protocol and leveraging a zwave communication chip in the mobile device.

In some examples, the native network application 142, 152 may be used as a programming keypad to add/remove/program sensors and other devices on an alarm (intrusion, fire, medical) system. For example, the native network application 142, 152 may provide an interface to the monitoring system control unit 110 to facilitate management of sensors and other devices controlled by the monitoring system control unit 110.

The native network application 142, 152 also may be used to add/remove/program IP video monitoring/surveillance cameras on an IP-based network (e.g., camera 174). The native network application 142, 152 may be used as a temporary interface for a networking router, hub, modem or other networked device that does not have its own user interface or display (e.g., the router 176). For example, the native network application 142, 152 displays the router settings screens without needing to go through a web browser on another network device.

In some implementations, the native network application 142, 152 may be used to program wireless network settings into a router, network printer, scanner, etc. This may avoid a user having to go through a computer web browser or difficult on-device UI.

In implementations in which the mobile device has long-range communication capability (e.g., cellular—GSM, CDMA, LTE etc—WiMax, or other), the native network application 142, 152 may be used to remotely access locally networked devices from anywhere. Any of the devices may be accessed and all of the applications described above may be performed from a remote location.

The native network application 142, 152 also may implement a permission system that provides a different level of control for different users. For instance, parent users may have full control of the network devices and a child user may have limited control (e.g., the child user may be able to add a first type of device, but may not be able to modify settings of existing devices or add a second type of device). The permission system may be implemented based on user-specific passcodes or particular mobile devices may be assigned to particular users.

In implementations in which multiple mobile devices are included in the system 100, the native network application 142, 152 may include rules that govern input from which of the multiple devices controls when conflicting input is received. For instance, when a parent user is attempting to perform a first action and a child user is attempting to perform a second, different action that conflicts with the first action, the rules of the native network application 142, 152 (or monitoring system in general) may perform only the first action because the parent user has higher priority than the child user.

Figure 2:
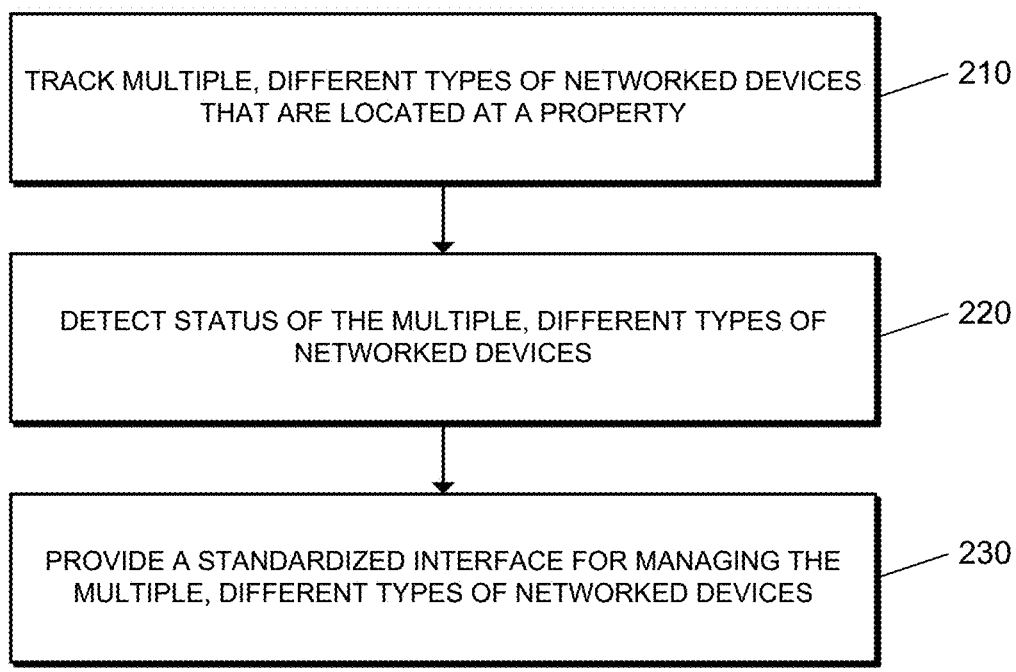
FIGS. 2, 4, and 6 are flow charts illustrating example processes.

FIG. 2 illustrates an example process. The operations of the example process are described generally as being performed by the system 100. The operations of the example process may be performed by one of the components of the system 100 (e.g., the monitoring application server 160 or the mobile device 140, 150 with the native network application 142, 152) or may be performed by any combination of the components of the system 100. In some implementations, operations of the example processes may be performed by one or more processors included in one or more electronic devices.

Figure 3:
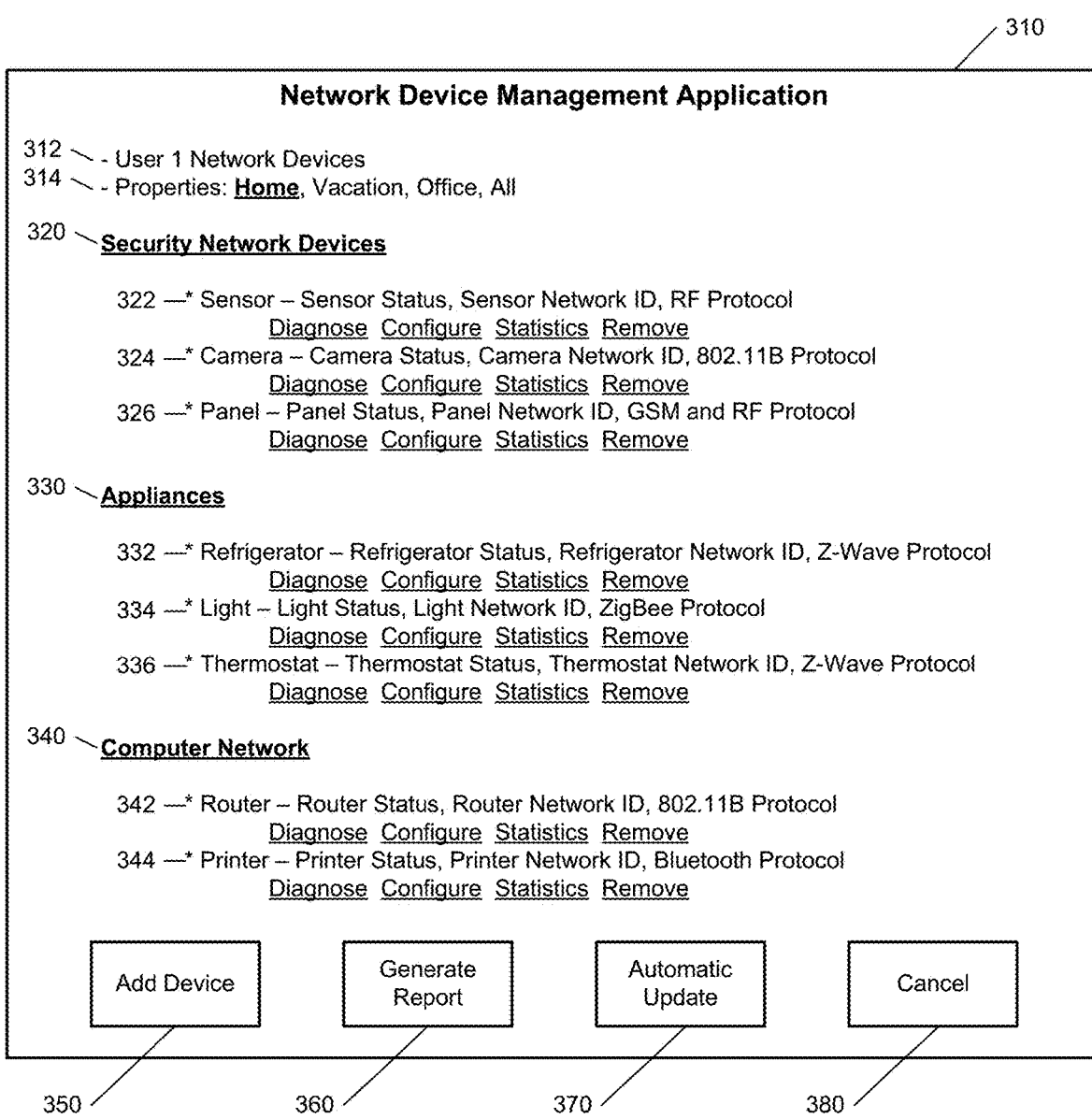
FIG. 3 illustrates an example of a standardized network device management interface.

FIG. 2 illustrates an example process 200 for providing a standardized interface for managing multiple, different types of networked devices. The system 100 tracks multiple, different types of networked devices that are located at a property (210). For instance, the system 100 may maintain, in electronic storage, a list of networked devices that are located at a property. The list of networked devices may include many different types of devices that communicate using many different types of protocols and perform many different types of functions. The system 100 may maintain the list of networked devices based on user input adding devices to a network located at a property or by tracking devices automatically added to the network located at the property. The example interface described in more detail below with respect to FIG. 3 illustrates an example list of multiple, different types of networked devices that are located at a property and tracked by the system 100.

The system 100 detects status of the multiple, different types of networked devices (220). For example, the system 100 exchanges communications with the multiple, different types of networked devices and determines the status of the multiple, different types of networked devices. In this example, the system 100 may determine status of the multiple, different types of networked devices by establishing a local connection with each of the multiple, different types of networked devices and receiving status information through the local connection. The local connection may be established by the native network application 142, 152 operating on the mobile device 140, 150.

The system 100 may detect any type of status information available from the multiple, different types of networked devices. For instance, the system 100 may detect current operating status or values (e.g., sensed values) related to operations performed by the multiple, different types of networked devices.

The system 100 provides a standardized interface for managing the multiple, different types of networked devices (230). For example, the system 100 may display a standardized interface that consolidates management of the multiple, different types of networked devices in a single display. In addition, the system 100 may display a standardized interface that provides a similar look and feel regardless of which type of network device is being managed. The standardized interface may include a standardized display of the detected status of the multiple, different types of networked devices and standardized control elements that enable similar types of control operations to be performed on the multiple, different types of networked devices.

FIG. 3 illustrates an example of a standardized network device management interface 310. The network device management interface 310 provides a standardized display of status information for several different types of network devices and includes standardized control elements for managing the several different types of network devices. The network device management interface 310 may provide enhanced network device management by providing a consolidated and easy to use interface for several different types of network devices.

The network device management interface 310 includes a user identification portion 312 and a properties portion 314. The user identification portion 312 indicates a user identifier for a user whose network devices are currently being displayed in the network device management interface 310. The properties portion 314 displays a listing of properties (e.g., a home property, a vacation property, and an office property) associated with the user identified in the user identification portion 312. The listing of properties may include the properties monitored by a monitoring system associated with the application displaying the network device management interface 310. A user may select one of the properties listed in the properties portion 314 to cause display of the network devices located at the selected property. Also, the properties portion 314 includes an "All" control that, when selected, causes display of all of the network devices located at all of the properties. In this example, the "Home" property has been selected and network devices located at the "Home" property are being displayed.

Based on selection of the "Home" property, the network device management interface 310 includes a security network devices portion 320, an appliances portion 330, and a computer network portion 340. The security network devices portion 320 displays network devices associated with the "Home" property that are part of a security system located at the "Home" property. As shown, the security network devices portion 320 has a sensor portion 322 for a sensor included in the security system, a camera portion 324 for a camera included in the security system, and a panel portion 326 for a control panel included in the security system.

The appliances portion 330 displays network devices associated with appliances located at the "Home" property. As shown, the appliances portion 330 has a refrigerator portion 332 for a refrigerator located at the "Home" property, a light portion 334 for a lighting device located at the "Home" property, and a thermostat portion 336 for a thermostat located at the "Home" property.

The computer network portion 340 displays network devices associated with a computer network located at the "Home" property. As shown, the computer network portion 340 has a router portion 342 for a router included in the computer network located at the "Home" property and a printer portion 344 for a printer included in the computer network located at the "Home" property.

The sensor portion 322, the camera portion 324, the panel portion 326, the refrigerator portion 332, the lighting portion 334, the thermostat portion 336, the router portion 342, and the printer portion 344 all include a standardized set of status information and controls that enable management of the network devices. For example, as shown, the standardized set of status information includes a display of a current status for the corresponding device (e.g., a current operating state or value of the corresponding device), a network identifier for the corresponding device, and a communication protocol for the corresponding device. In addition, the controls that enable management of the network devices include a diagnose control that initiates a diagnosis routine for the corresponding device when selected, a configure control that initiates a configuration process for the corresponding device when selected, a statistics control that causes display of statistics tracked for the corresponding device, and a remove control that causes removal of the corresponding device from the network of devices at the "Home" property.

The network device management interface 310 may provide enhanced network device management because several different types of network devices that use several different types of communication protocols are displayed and managed in a consolidated and standardized interface. In this regard, the network device management interface 310 may provide a single convenient place for user management of network devices that are located at a single property (or multiple properties) of the user. In addition, the network device management interface 310 provides a detailed visual interface with the same look and feel for managing several, different types of network devices, which may enhance a user's convenience in handling device management for several types of network devices that each have a limited or no display interface for device control.

Further, the network device management interface 310 includes an add device control 350, a generate report control 360, an automatic update control 370, and a cancel control 380. The add device control 350, when activated, initiates a process to add a new device to the network of devices at the "Home" property. For example, the add device control 350 may cause display of another interface that enables a user to add details for a new device being added to the network of devices at the "Home" property. In this example, the add device control 350 may cause display of an add device wizard that poses a series of questions (e.g., type of device, protocol used, etc.) to a user to gain the information needed to add the new device to the network of devices at the "Home" property.

The generate report control 360, when activated, initiates a process to generate a report for the network of devices at the "Home" property. The report may be displayed or transmitted to another device after being generated and may include status information tracked for the network of devices at the "Home" property over time. The status information may include network device management commands associated with the network devices and operating status values for the network devices. In generating the report, the network management application may aggregate status information tracked for each of the network devices at the "Home" property over time and combines the aggregated status information in a report. The report may include statistics computed based on the aggregated status information and charts or graphs that reflect the aggregated status information. The generate report control 360 may provide enhanced reporting capability because it provides a single report that includes information for all of the different, types of network devices located at the "Home" property.

The automatic update control 370, when activated, initiates a process to automatically update the network of devices at the "Home" property. For instance, the automatic update control 370 may automatically cause an update to the network device management interface 310 by refreshing status information displayed by the network device management interface 310.

The automatic update control 370 also may initiate a process that automatically searches for network devices located at the "Home" property and updates the network device management interface 310 accordingly. For example, when a mobile device operating the network management application that is displaying the network device management interface 310 is located in the "Home" property, the network management application automatically searches for devices using the wireless protocols supported by the network management application. When the network management application detects a new device, the network management application may automatically add the new device to the network of devices at the "Home" property and update the network device management interface 310 to reflect the addition. When the network management application fails to detect a device previously identified as being included in the network of devices at the "Home" property, the network management application may automatically remove the undetected device from the network of devices at the "Home" property and update the network device management interface 310 to reflect the removal.

The cancel control 380, when activated, causes the network management application to close the network device management interface 310 and causes the device operating the network management application to resume normal operation.

Figure 4:
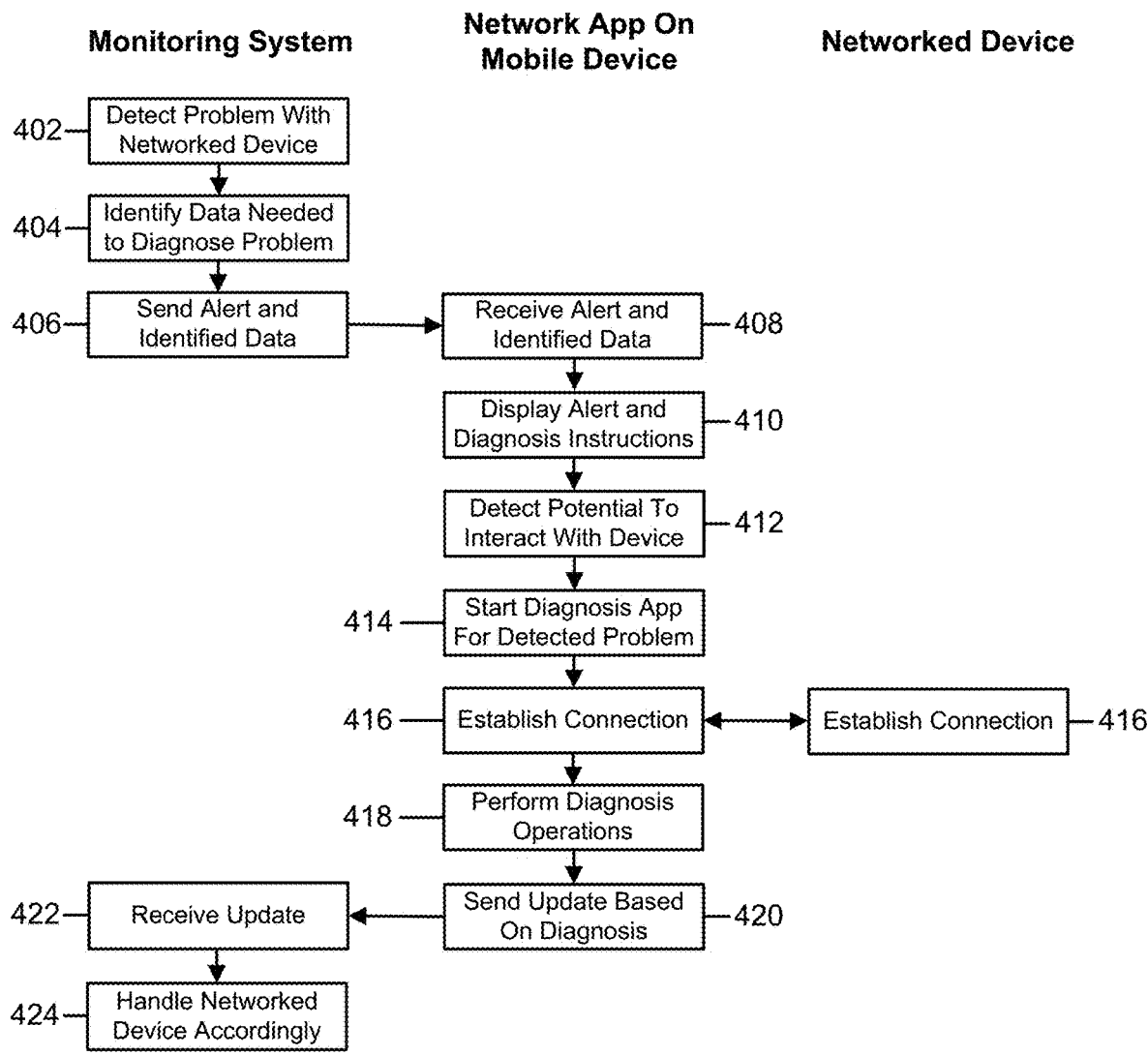

FIG. 4 illustrates an example process 400 for diagnosing a detected problem with a networked device. For convenience, a monitoring system (e.g., the monitoring application server 160), a native network application loaded on a mobile device (e.g., the native network application 142, 152 loaded on the mobile device 140, 150), and a networked device (e.g., one of the devices 170, 172, 174, and 176) are referenced as performing the process 400. However, similar methodologies may be applied in other implementations where different components are used to define the structure of the system, or where the functionality is distributed differently among the components.

The monitoring system detects a problem with a networked device located at a property (402). For instance, the monitoring system may detect that the networked detect is experiencing an error in communication based on a lack of receipt of communications from the networked device. The monitoring system may detect that the networked device is experiencing another type of error based on an error code received from the networked device or an observed lack of performance by networked device. For example, when the networked device communicates with a thermostat, the monitoring system may detect an error in controlling the thermostat based on a control error code being provided by the networked device to the monitoring system or based on a temperature measurement generated by the thermostat not matching a thermostat temperature setting set by the monitoring system.

The monitoring system identifies data needed to diagnose the detected problem (404) and, in response, sends an alert with the identified data to a native mobile device network application loaded on a mobile device (406). The identified data may include a device identifier for the networked device for which the problem was detected, a problem identifier that identifies the type of problem detected, and/or authorization data (e.g., a security key) that authorizes another device to control the networked device. The device identifier may enable the native mobile device network application to determine which networked device needs diagnosis, the problem identifier may enable the native mobile device network application to determine the type of problem that needs diagnosis, and the authorization data may enable the native mobile device network application at least temporary authorization to communicate with and control the networked device over a local connection.

In some examples, the monitoring system may determine that the native mobile device network application has been associated with the networked device and is available to manage the networked device over a local connection (e.g., a local wired connection or over a short range wireless communication protocol, such as Z-Wave, ZigBee, Bluetooth, etc.). In response to this determination, the monitoring system sends the alert and the identified data to the native mobile device network application to enable the native mobile device network application to diagnose the networked device.

The native mobile device network application receives the alert and the identified data (408) and, in response to receiving the alert and the identified data, displays the alert with diagnosis instructions (410). For instance, the alert and diagnosis instructions may include information identifying the networked device that needs diagnosis and the type of problem detected.

The diagnosis instructions also may include instructions for how a user establishes a local connection with the networked device using the native mobile device network application. For instance, the diagnosis instructions may provide instructions for establishing a wired connection between the networked device and the mobile device operating the native mobile device network application. The diagnosis instructions also may provide instructions for establishing a wireless connection between the networked device and the mobile device operating the native mobile device network application (e.g., move within a certain distance of the networked device and initiate a connection). The diagnosis instructions further may provide instructions for authorizing the mobile device operating the native mobile device network application with the networked device (e.g., enter a particular pass code sequence within local connection range of the networked device).

The native mobile device network application detects potential to interact with the networked device (412). For example, the native mobile device network application may detect potential to interact with the networked device based on detecting a wired connection being established with another device or determining that the mobile device is within range to wirelessly communicate with the networked device. In this example, the native mobile device network application may determine that the mobile device is within range to wirelessly communicate with the networked device based on a pinging communication exchanged with the networked device or by determining, based on a detected geographic location of the mobile device, that the mobile device is within a threshold distance of the networked device.

In response to detecting potential to interact with the networked device, the native mobile device network application starts a diagnosis application for the detected problem (414). The native mobile device network application may select the diagnosis application from among multiple, possible diagnosis applications based on the networked device and/or the detected problem. For example, the native mobile device network application may select a diagnosis application that is appropriate for the communication protocol used by the networked device, the features included in the networked device, and the problem detected. The native mobile device network application also may start a generic diagnosis application, but configure the generic diagnosis application based on the networked device and/or the detected problem. The native mobile device network application may start the diagnosis application automatically, without human intervention, in response to detecting potential to interact with the networked device, or may display a suggestion to start the diagnosis application in response to detecting potential to interact with the networked device and await user input confirming the suggestion prior to starting the diagnosis application.

The native mobile device network application establishes a connection with the networked device (416). For instance, the native mobile device network application establishes a local connection with the networked device. The local connection may be a local wired connection or a short range wireless connection that is enabled by a prior registration or pairing process between the native mobile device network application and the networked device. The native mobile device network application may use authorization information (e.g., a security key) received from the monitoring system to authenticate itself to the networked device and gain authorization for establishing the connection.

After establishing the connection, the native mobile device network application performs diagnosis operations using the established connection (418) and sends an update to the monitoring system based on the diagnosis operations (420). For instance, the native mobile device network application exchanges communications over the established connection to attempt to diagnose the error experienced by the networked device. The diagnosis operations may be selected by the native mobile device network application as diagnosis operations tailored to the problem detected by the monitoring system. The update sent to the monitoring system may indicate that the error has been resolved based on the diagnosis operations, may indicate that the error was not resolved based on the diagnosis operations, or may indicate more detailed information related to the error detected by the monitoring system.

The monitoring system receives the update (422) and handles the networked device accordingly (424). For example, when the update indicates that the error has been resolved, the monitoring system confirms that the error has been resolved and resumes operation of the networked device. In another example, when the update indicates that the error has not been resolved, the monitoring system maintains the networked device in a disabled state and takes action to cause replacement of the networked device (e.g., dispatches service personnel to the property at which the networked device is located or provides a message suggesting replacement to a user associated with the networked device). In a further example, when the update indicates more detailed diagnosis information, the monitoring system analyzes the more detailed diagnosis information and takes an appropriate action based on the analysis (e.g., determines that the problem is being caused by the monitoring system and attempts to resolve the problem).

Figure 5A:
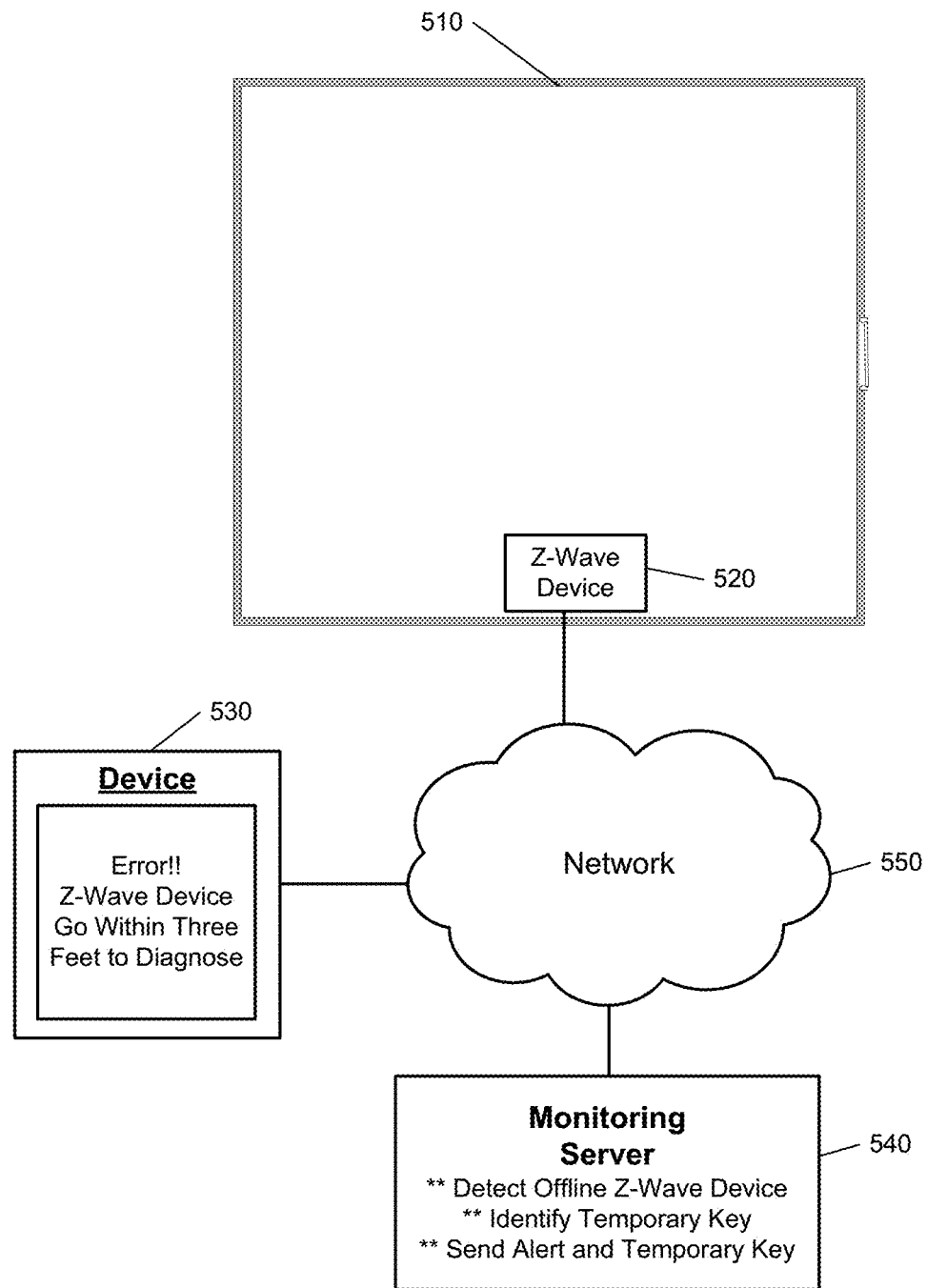
FIGS. 5A and 5B illustrate an example of diagnosing a detected problem with a networked device.
Figure 5B:
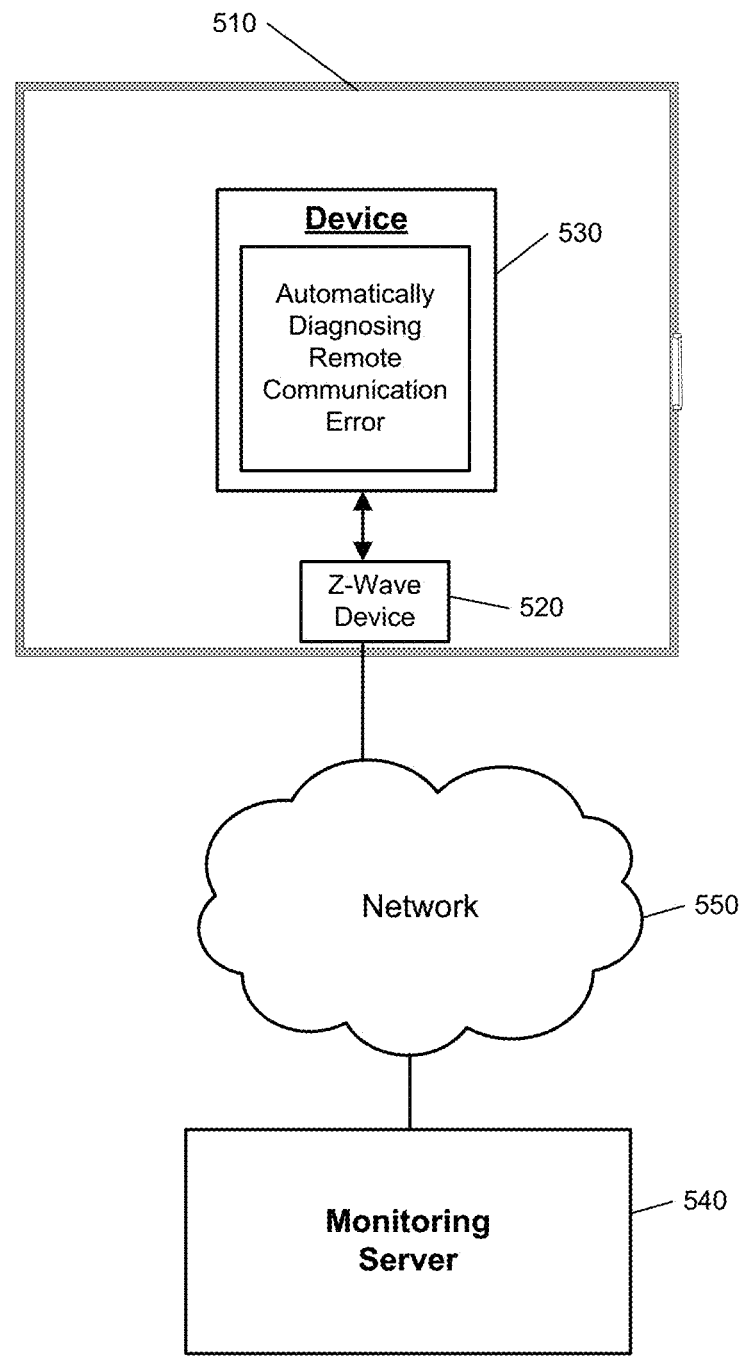

FIGS. 5A and 5B illustrate an example of diagnosing a detected problem with a networked device. As shown, a property 510 includes a Z-Wave device 520. The Z-Wave device 520 may be a controllable unit connected to or integrated in a lighting device, an entertainment device, a household appliance, or a security system component. The Z-Wave device 520 is managed by a mobile device 530 that has loaded a native mobile device network application. The native mobile device network application may be used to transform the mobile device 530 into a Z-Wave controller that is able to interact with and control the Z-Wave device 520 using the Z-Wave communication protocol. The mobile device 530 may use the native mobile device network application to provide a visual control display for the Z-Wave device 520, which otherwise does not have a control interface or display.

A monitoring server 540 communicates with the Z-Wave device 520 and the mobile device 530 over a network 550, which may be similar to the network 105 described above with respect to FIG. 1. The monitoring server 540 may exchange communications over the network 550 to receive data generated by the Z-Wave device 520 or provide control communications that ultimately reach the Z-Wave device 520. The exchanged communication are not over the Z-Wave communication protocol because the monitoring server 540 is located remote from the property 510 and, as such, is not physically close enough to the Z-Wave device 520 to enable communication over the Z-Wave communication protocol. As such, the monitoring server 540 may exchange communications directly over the network 550 with the Z-Wave device 520 when the Z-Wave device 520 has another communication interface that enables communication over the network 550. Alternatively, the monitoring server 540 may exchange communications indirectly with the Z-Wave device 520 when the Z-Wave device 520 does not have a communication interface that enables communication over the network 550, but is in communication with another device (e.g., a control panel) that is able to communicate over the network 550.

In the example shown in FIG. 5A, the monitoring server 540 has detected a problem with the Z-Wave device 520. Specifically, the monitoring server 540 has detected the Z-Wave device 520 as being offline because the monitoring server 540 is not receiving communications from the Z-Wave device 520. In response to detecting the problem, the monitoring server 540 identifies the mobile device 530 as being permitted to control the Z-Wave device 520, determines to send an alert to the mobile device 530 to indicate the problem, and identifies a temporary key that gives the mobile device 530 temporary access to control the Z-Wave device 520. The temporary key may be a temporary security key that the Z-Wave device 520 and the monitoring server 540 pre-set to enable the monitoring server 540 to authorize another device to access the Z-Wave device 520 using the Z-Wave communication protocol. The temporary key may provide enhanced security for the Z-Wave device 520 because other devices will not be able to control the Z-Wave device 520 without authorization from the monitoring server 540.

After identifying the temporary key, the monitoring server 540 sends, to the mobile device 530, the temporary key with an alert that describes the problem with the Z-Wave device 520 detected by the monitoring server 540. The mobile device 530 receives the temporary key with the alert and, in response, displays an alert to indicate that an error with the Z-Wave device 520 has been detected. The mobile device 530 also determines that it is presently too far away from the Z-Wave device 520 to communicate with it over the Z-Wave communication protocol and, as such, displays an instruction to go within range (e.g., three feet) of the Z-Wave device 520, so that the mobile device 530 can communicate with the Z-Wave device 520 over the Z-Wave communication protocol.

In the example shown in FIG. 5B, a user has moved the mobile device 530 within range (e.g., three feet) of the Z-Wave device 520. Accordingly, the mobile device 530 detects that it is within range of the Z-Wave device 520 and automatically, without human intervention, begins attempting to communicate with the Z-Wave device 520 in an effort to diagnose the problem detected by the monitoring server 540. Specifically, the mobile device 530 automatically initiates a diagnostic routine that is specifically directed to troubleshooting and resolving the remote communication error detected by the monitoring server 540. In this regard, the mobile device 530 may provide a user with an enhanced mechanism for controlling and diagnosing problems with the Z-Wave device 520. Because the mobile device 530 is a device (e.g., a smart phone) that a user typically has in his or her possession for reasons other than controlling the Z-Wave device 520, the user may be quickly alerted to the detected problem and may be able to easily diagnose and remedy the problem without having locate or purchase other equipment (e.g., a dedicated Z-Wave controller) to manage with the Z-Wave device 520.

Figure 6:
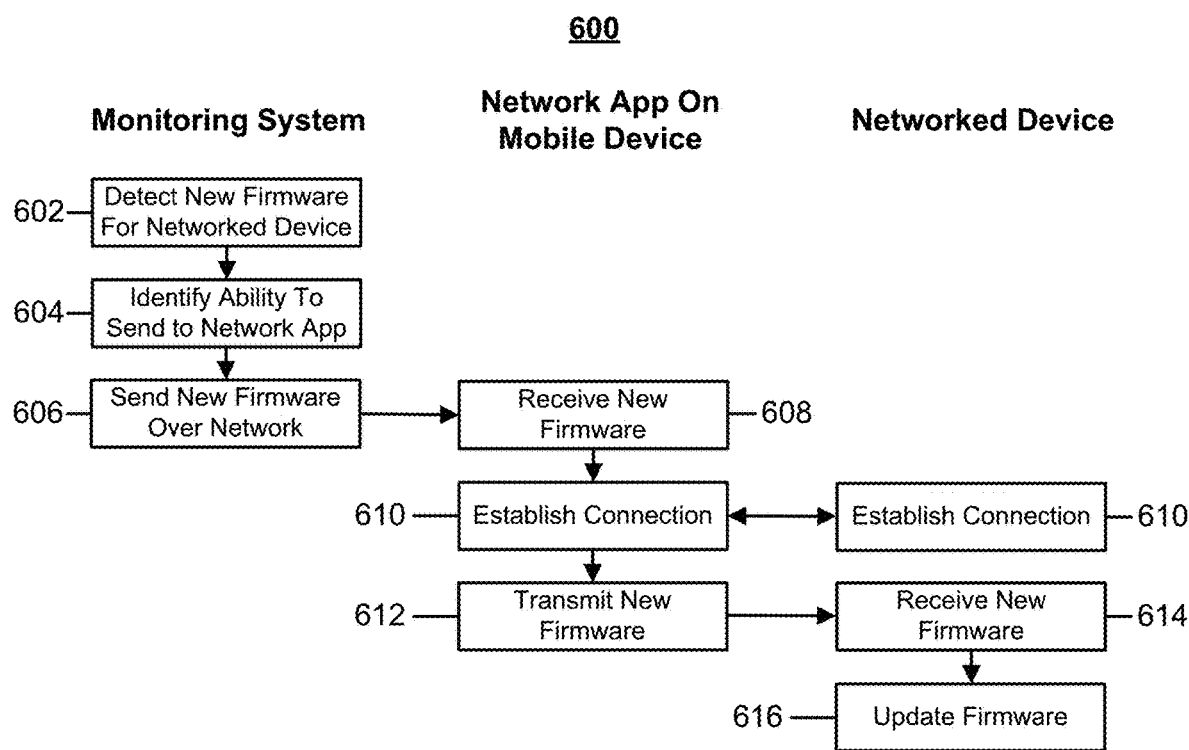

FIG. 6 illustrates an example process 600 for updating firmware of networked devices. For convenience, a monitoring system (e.g., the monitoring application server 160), a native network application loaded on a mobile device (e.g., the native network application 142, 152 loaded on the mobile device 140, 150), and a networked device (e.g., one of the devices 170, 172, 174, and 176) are referenced as performing the process 600. However, similar methodologies may be applied in other implementations where different components are used to define the structure of the system, or where the functionality is distributed differently among the components.

The monitoring system detects new firmware for a networked device located at a property (602). For instance, the monitoring system may detect that a firmware update (e.g., a firmware patch) or an entirely new firmware application has been stored in electronic storage of the monitoring system. The monitoring system may detect the new firmware in electronic storage based on user input indicating that the firmware is for the networked device.

The monitoring system identifies an ability to send the new firmware to a native mobile device network application loaded on a mobile device (604) and, in response, sends, over a network, the new firmware to the native mobile device network application loaded on the mobile device (606). For instance, the monitoring system may determine that the native mobile device network application has been associated with the networked device and is available to transmit data to the networked device over a local connection (e.g., a local wired connection or over a short range wireless communication protocol, such as Z-Wave, ZigBee, Bluetooth, etc.). The monitoring system sends the new firmware to the native mobile device network application over a network connection (e.g., the Internet). The network connection may be less time-consuming or less expensive than other communication options (if any) the monitoring system has for communicating with the networked device.

The native mobile device network application receives the new firmware (608) and, in response to receiving the new firmware, establishes a connection with the networked device (610). For instance, the native mobile device network application establishes a local connection with the networked device. The local connection may be a local wired connection or a short range wireless connection that is enabled by a prior registration or pairing process between the native mobile device network application and the networked device. The native mobile device network application may display an indication that new firmware has been received for the networked device with a request that the user establish a local connection with the networked device to enable a firmware update. The request may be a request to establish a wired connection between the networked device and the mobile device or a request to move the mobile device to location that is within range of the networked device for a short range wireless communication protocol (e.g., move within three feet of the device). The native mobile device network application also may monitor its ability to communicate with the networked device over a short range wireless communication protocol and automatically, without human intervention, establish the connection when the native mobile device network application detects ability to communicate with the networked device over the short range wireless communication protocol.

After establishing the connection, the native mobile device network application transmits the new firmware over the established connection (612) and the networked device receives the new firmware (614). The networked device then updates its firmware using the new firmware received from the native mobile device network application over the established connection (616).

Figure 7:
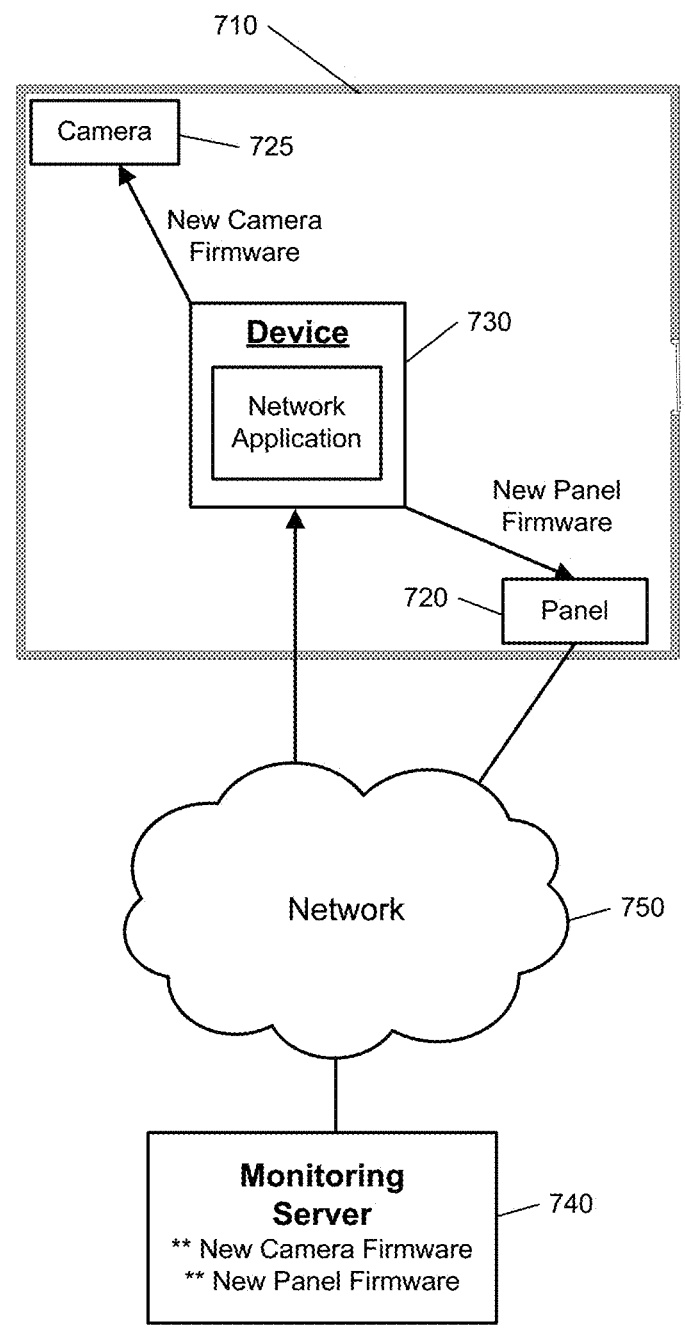
FIG. 7 illustrates an example of updating firmware of networked devices.

FIG. 7 illustrates an example of updating firmware of a networked device. As shown, a property 710 is monitored by a local monitoring system (e.g., a security system) located at the property 710. The local monitoring system includes a control panel 720 and a camera 725. The control panel 720 displays status information for the local monitoring system and includes one or more input controls that enable control of the local monitoring system. The camera 725 captures images of the property 710, which may be used to detect security events and enable remote visual monitoring of the property 710. The local monitoring system has been described as including only the control panel 720 and the camera 725 for brevity, but may include many more sensors and features.

The devices of the local monitoring system (e.g., the control panel 720 and the camera 725) are managed by a mobile device 730 that has loaded a native mobile device network application. The mobile device 730 may use the native mobile device network application for inclusion or removal of devices from the local monitoring system, monitoring status of devices from the local monitoring system, diagnosing problems with devices from the local monitoring system, configuring attributes of devices from the local monitoring system, exchanging data (e.g., firmware updates) with devices from the local monitoring system, or performing any other techniques described throughout this disclosure as being performed by a native mobile device network application. The mobile device 730 may use the native mobile device network application to provide an enhanced visual control display for the control panel 720 and the camera 725 when the control panel 720 and the camera 725 have a limited or no display device.

A monitoring server 740 communicates with the control panel 720 and the mobile device 730 over a network 750, which may be similar to the network 105 described above with respect to FIG. 1. More specifically, the monitoring server 740 communicates, over a cellular (e.g., GSM) portion of the network 750, with a network communications module included in the control panel 720 and communicates, over an IP-based (e.g., the Internet) portion of the network 750, with the mobile device 730. The monitoring server 740 receives monitoring system data (e.g., detected security alerts) from the control panel 720 and, in some examples, receives image data captured by the camera 725 through the control panel 720. The monitoring server 740 exchanges, with the mobile device 730, data related to management of devices included in the local monitoring system. In this example, it may be more expensive and/or time-consuming for the monitoring server 740 to communicate with the control panel 720 over the cellular (e.g., GSM) portion of the network 750, than for the monitoring server 740 to communicate with the mobile device 730 over the IP-based (e.g., the Internet) portion of the network 750.

Because of the differences in the monitoring server's 740 ability to communicate with the control panel 720 and the camera 725 as compared to the mobile device 730, the monitoring server 740 uses the mobile device 730 as conduit for transmitting larger data, such as firmware updates, to the control panel 720 and the camera 725. In this example, the monitoring server 740 detects that new firmware is available for the control panel 720 and the camera 725 and, in response to detecting the new firmware, determines how best to transmit the new firmware to the control panel 720 and the camera 725. Specifically, the monitoring server 740 determines that the control panel 720 and the camera 725 are only able to receive data from the monitoring server 740 over the cellular (e.g., GSM) portion of the network 750 and also determines that the mobile device 730 has loaded the native mobile device network application and is available to assist in managing firmware updates for the control panel 720 and the camera 725. Based on these determinations, the monitoring server 740 transmits the new firmware for the control panel 720 and the camera 725 to the mobile device 730 over the IP-based (e.g., the Internet) portion of the network 750.

After receiving the new firmware for the control panel 720 and the camera 725, the mobile device 730 monitors for a time when the mobile device 730 is able to establish a local connection with the control panel 720 and the camera 725. The local connection may be a wired connection or a short range wireless connection, either of which may be faster and/or less expensive than the monitoring server 740 communicating with the control panel 720 over the cellular (e.g., GSM) portion of the network 750. When the mobile device 730 detects ability to establish a local connection with the control panel 720 and/or the camera 725, the mobile device 730 transmits the new firmware for the control panel 720 and/or the camera 725 to the control panel 720 and/or the camera 725 over the established local connection. In this regard, the mobile device 730 acts as a conduit for providing the new firmware to the control panel 720 and the camera 725, which may result in an efficient firmware update for the control panel 720 and the camera 725 that does not involve direct communication by the control panel 720 or the camera 725 with the monitoring server 740.

In some implementations, the monitoring server 740 may intelligently determine when to use the mobile device 730 as a conduit for exchanging data (e.g., firmware updates) between itself and the control panel 720 and the camera 725. In these implementations, when the camera 725 is an IP-based camera that is able to communicate with the monitoring server 740 over the IP-based (e.g., the Internet) portion of the network 750, the monitoring server 740 may directly transmit data (e.g., firmware updates) to the camera 725 and indirectly transmit data (e.g., firmware updates) to the control panel 720 through the mobile device 730. The monitoring server 740 also may consider the size of the data that needs to be exchanged and the speed in which the transfer is needed when deciding how the transfer should be completed. For example, when the data is relatively small, the monitoring server 740 may directly exchange the data with the control panel 720, rather than going through the mobile device 730. In another example, when the data is critical (e.g., a critical firmware update) and the mobile device 730 is detected as being remote from the control panel 720 and the camera 725, the monitoring server 740 may directly exchange the critical data (e.g., the critical firmware update) with the control panel 720 because the exchange is of high importance and the mobile device 730 is unlikely to be able to relay the critical data to the control panel 720 and the camera 725 in a timely manner due to its remote location from the control panel 720 and the camera 725.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system for monitoring network devices located at properties, the system comprising:
    a monitoring system that is configured to monitor multiple geographically separated properties for a user, each of the multiple properties including multiple, different types of networked devices;
    a native mobile device network application loaded onto a mobile device, the native mobile device network application including instructions that, when executed by the mobile device, cause the mobile device to perform operations comprising:
        tracking the multiple, different types of networked devices and association of networked devices with the multiple geographically separated properties;
        providing an interface for managing the multiple, different types of networked devices, the interface enabling a display of status of the multiple, different types of networked devices and enabling control of the multiple, different types of networked devices,
    wherein providing the interface for managing the multiple, different types of networked devices comprises:
        identifying the multiple geographically separated properties for the user that are monitored by the monitoring system;
        causing display of the multiple geographically separated properties on the interface in a manner that enables the user to select one of the multiple geographically separated properties, where the multiple geographically separated properties are caused to be displayed as selectable controls that each represent one of the multiple geographically separated properties;
        receiving a selection of a particular selectable control that represents a particular geographic property from among the multiple selectable controls that represent the multiple geographically separated properties; and
        in response to receiving the selection of the particular selectable control that represents the particular geographic property from among the multiple selectable controls that represent the multiple geographically separated properties:
            identifying, from among the multiple, different types of networked devices, particular networked devices associated with the particular geographic property, the particular networked devices being a subset of the multiple, different types of networked devices, and
            displaying, on the interface, a representation of the particular networked devices associated with the particular geographic property,
    wherein the multiple, different types of networked devices include a first device configured to communicate using a Z-Wave protocol, a second device configured to communicate using a ZigBee protocol, a third device configured to communicate using a Bluetooth protocol, and a fourth device configured to communicate over a wireless local area network based on an IEEE 802.11 standard; wherein tracking the multiple, different types of networked devices comprises tracking the first device, the second device, the third device, and the fourth device; and wherein providing the interface for managing the multiple, different types of networked devices comprises providing an interface for managing the first device, the second device, the third device, and the fourth device.

2. The system of claim 1:
wherein the multiple, different types of networked devices include a security system device that is part of a security system that monitors at least one of the multiple geographically separated properties and that performs functionality related to the security system, an appliance device that is associated with an appliance located at at least one of the multiple geographically separated properties and performs functionality related to controlling the appliance, and a computer network device that is part of a local computer network at at least one of the multiple geographically separated properties and that performs functionality related to the local computer network;

wherein tracking the multiple, different types of networked devices comprises tracking the security system device, the appliance device, and the computer network device; and wherein providing the interface for managing the multiple, different types of networked devices comprises providing an interface for managing the security system device, the appliance device, and the computer network device.

3. The system of claim 1, wherein the native mobile device network application configures the mobile device to operate as a Z-Wave controller that is capable of including and removing Z-Wave devices on a Z-Wave network.

4. The system of claim 1, wherein providing the interface for managing the multiple, different types of networked devices comprises providing an interface that includes a user identification portion that indicates a user identifier for the user whose network devices are currently being displayed in the interface and that includes a control that, when selected, causes display of all network devices located at all of the multiple geographically separated properties.

5. The system of claim 1, wherein providing the interface for managing the multiple, different types of networked devices comprises providing an interface with a diagnose control that enables a user to initiate a diagnosis process for one or more of the multiple, different types of networked devices by selecting the diagnose control.

6. The system of claim 1, wherein providing the interface for managing the multiple, different types of networked devices comprises providing an interface with a configure control that enables a user to configure settings for one or more of the multiple, different types of networked devices by selecting the configure control.

7. The system of claim 1, wherein providing the interface for managing the multiple, different types of networked devices comprises providing an interface with a statistics control that enables a user to display statistics for one or more of the multiple, different types of networked devices by selecting the statistics control.

8. The system of claim 1, wherein providing the interface for managing the multiple, different types of networked devices comprises providing an interface with a remove control that enables a user to remove one or more of the multiple, different types of networked devices from a network by selecting the remove control.

9. The system of claim 1, wherein providing the interface for managing the multiple, different types of networked devices comprises providing an interface with an add control that enables a user to add a networked device to a network by selecting the add control.

10. The system of claim 1, wherein providing the interface for managing the multiple, different types of networked devices comprises providing an interface with a report control that enables a user to initiate a report generation process that aggregates status data for the multiple, different types of networked devices and combines the status data for the multiple, different types of networked devices in a report.

11. The system of claim 1, wherein providing the interface for managing the multiple, different types of networked devices comprises providing an interface with an update control that enables a user to initiate an automatic update process that automatically updates one or more of the multiple, different types of networked devices.

12. The system of claim 1:
wherein the monitoring system is configured to perform operations comprising:
detecting a problem with one of the multiple, different types of networked devices, and
in response to detecting the problem, sending an alert to the native mobile device network application identifying the detected problem and the networked device associated with the detected problem; and
wherein the native mobile device network application further includes instructions that, when executed by the mobile device, cause the mobile device to perform operations comprising:
receiving the alert identifying the detected problem and the networked device associated with the detected problem;
establishing a local connection with the networked device associated with the detected problem; and
performing, using the established connection, diagnosis operations based on the detected problem.

13. The system of claim 12:
wherein sending the alert to the native mobile device network application identifying the detected problem and the networked device associated with the detected problem comprises:
identifying authorization information needed by the native mobile device network application to establish a connection with the networked device associated with the detected problem, and
sending the identified authorization information to the native mobile device network application in addition to the alert; and
wherein establishing the local connection with the networked device associated with the detected problem comprises establishing the local connection with the networked device associated with the detected problem using the identified authorization information.

14. The system of claim 12, wherein the native mobile device network application further includes instructions that, when executed by the mobile device, cause the mobile device to perform operations comprising:
in response to receiving the alert identifying the detected problem and the networked device associated with the detected problem, displaying the alert with instructions for diagnosing the detected problem;
after displaying the alert with instructions for diagnosing the detected problem, detecting potential to interact with the networked device associated with the detected problem; and
in response to detecting potential to interact with the networked device associated with the detected problem, automatically, without human intervention, starting a diagnosis process used to diagnose the detected problem.

15. The system of claim 12:
wherein the native mobile device network application further includes instructions that, when executed by the mobile device, cause the mobile device to perform operations comprising sending an update to the monitoring system that describes results of the performance of the diagnosis operations; and
wherein the monitoring system is further configured to perform operations comprising:

receiving the update that describes results of the performance of the diagnosis operations, and handling the networked device associated with the detected problem based on the received update that describes results of the performance of the diagnosis operations.

16. The system of claim 1, wherein identifying, from among the multiple, different types of networked devices, particular networked devices associated with the particular geographic property comprises identifying networked devices located within the particular geographic property.

17. The system of claim 1, wherein causing display of the identified networked devices on the interface, where the networked devices are displayed grouped by the type of the networked devices comprises:

providing in the standardized interface a security network device portion that lists all security network devices within the selected one of the multiple geographically separated properties, an appliance portion that lists all appliances within the selected one of the multiple geographically separated properties, and a computer network portion that lists all network devices associated with a computer network within the selected one of the multiple geographically separated properties.

18. The system of claim 1, wherein displaying, on the interface, the representation of the particular networked devices associated with the particular geographic property comprises:

displaying the particular networked devices on the interface, where each networked device is displayed with a corresponding current status for the networked device, a network identifier for the networked device, and a communication protocol for the networked device.

19. The system of claim 1, the operations comprising:

in response to receiving the selection of the selectable control that represents the particular geographic property from among the multiple selectable controls that represent the multiple geographically separated properties, establishing a first connection between the mobile device and a first networked device within the particular geographic property using a first short-range communication protocol and a second connection between the mobile device and a second networked device within the particular geographic property using a second short-range communication protocol; and obtaining statuses of the first networked device and second networked device over the first connection and the second connection, wherein the representation of the first networked device includes information from the status obtained by the mobile device through the connection between the mobile device and the first networked device over the first short-range communication protocol, wherein the representation of the second networked device includes information from the status obtained by the mobile device through the connection between the mobile device the second networked device over the second short-range communication protocol.

* * * * *